July 22, 1958 — I. W. SVÄNNEL — 2,844,030
LIQUID-LEVEL INDICATORS
Filed May 15, 1957
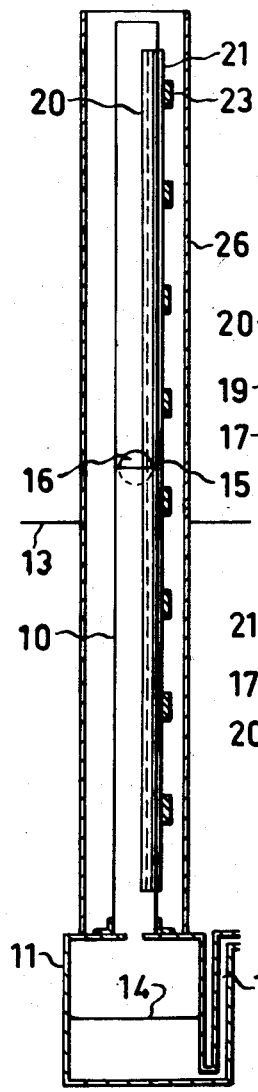
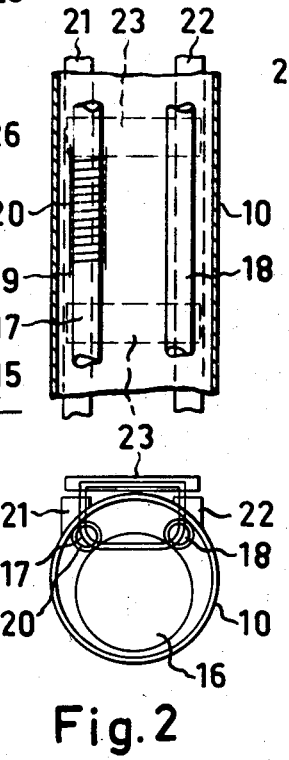
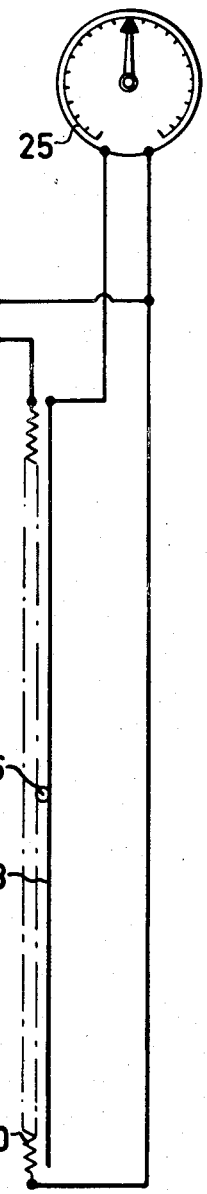

United States Patent Office 2,844,030
Patented July 22, 1958

2,844,030

LIQUID-LEVEL INDICATORS

Ivar Wiking Svännel, Knislinge, Sweden

Application May 15, 1957, Serial No. 659,411

Claims priority, application Sweden July 6, 1956

5 Claims. (Cl. 73—313)

This invention relates to a liquid-level indicator comprising a substantially vertical liquid-level tube, means forming two electrically conductive substantially parallel surfaces arranged within said tube longitudinally thereof and insulated from each other, a pair of members being magnetized by opposed polarity and extending each along one of said conductive surfaces, movable roller means disposed in said tube and consisting at least in part of electrically conductive and magnetically permeable material to be held in engagement with the conductive surfaces by the magnetism of said members, thus forming an electric connection between said surfaces, said roller means being adapted to float on the liquid in said tube and to roll along said conductive surfaces according as the liquid-level fluctuates, and an electric circuit connected to said conductive surfaces to indicate the position of the movable roller means relative to said conductive surfaces.

As compared with prior art liquid-level indicators of the type in which movable means is in electric communication with the conductors in the tube over sliding contacts, the liquid-level indicator according to the present invention gives the advantage that the movable roller means can effect a movement almost entirely free of friction along said conductors simultaneously as a satisfactory engagement pressure is maintained between the movable means and the conductors, thus making the liquid-level indicator according to the invention extremely reliable and exact.

For a better understanding the invention will be described more in detail in the following, reference being had to the accompanying drawing in which:

Fig. 1 is a sectional view of an embodiment of the liquid-level indicator taken axially thereof;

Fig. 2 is an enlarged cross sectional view of the liquid-level indicator in Fig. 1;

Fig. 3 is an enlarged fragmentary sectional view of the liquid tube, taken axially thereof at right angles to the view of Fig. 1; and Fig. 4 is a schematic diagram of an indicating circuit.

The liquid-level indicator illustrated comprises a substantially vertical tube 10 of electrically non-conductive and magnetically non-permeable material, for instance a plastic material. At its lower end the tube is attached to a container 11 communicating therewith. From a point adjacent the bottom of the container 11 there extends a tube 12 upwardly along the container, the upper open end of said tube being approximately at a level with the upper edge of the container. The tube 10 and the container 11 contain an electrically insulating liquid lighter than the liquid, the level fluctuations of which are to be measured. If the last-mentioned liquid is water, the lighter liquid may be for instance oil or kerosene. When the tube 10 and the container 11 are submerged in the liquid, the level fluctuations of which are to be measured and the level of which is designated 13, the liquid level in said tube 10 and said container 11 according to the physical laws of communicating vessels is in balance with the liquid column surrounding the tube and the container, the surface separating the lighter and the heavier liquid being located for instance at 14 in the container 11.

A ball 16 consisting at least partially of electrically conductive and magnetically permeable material floats on the lighter liquid in the tube 10 the level of which is designated 15. Said ball 16 may be e. g. a hollow iron ball of such dimensions that it has approximately half its volume submerged in the liquid. Mounted on the interior surface of the tube 10 longitudinally thereof are two parallel members 17 and 18 both of which consist of iron pipes of circular cross section. The member 17 is provided with an insulation layer 19 on which a resistance wire 20 is wound. Disposed on the outer side of the tube 10 are two other members 21 and 22 likewise of iron and arranged each opposite one of the members 17 and 18 on the interior surface of the tube 10. At regular intervals longitudinally of the tube 10 the members 21 and 22 are bridged by means of permanent magnetic elements 23 which all have like magnet poles in one and the same direction. The members 21 and 22 thus constitute opposite poles of a magnet whereby a magnetic circuit is established from one member on the outer surface of the tube through the opposite member on the interior surface of the tube, ball 16 and the other member on the interior surface of the tube to the other member on the outer surface of the tube, as indicated by flux lines in Fig. 2. This magnetic circuit serves the purpose of holding the ball 16 in engagement with the winding 20 and the member 18 within said tube. To realize the largest possible engagement pressure the members should as far as possible conform to the tube 10 so that the smallest possible gap results between the outer and inner members.

The ball 16 forms a contact element between the member 18 and the winding 20 arranged on the member 17, said member 18 and said winding 20 being included in an indicating circuit of e. g. the design shown in Fig. 4.

According to Fig. 4, the two ends of the winding 20 are connected to the two pole terminals of a current source 24, while the upper end of the member 18 is connected to one terminal of a voltmeter 25, the other terminal of which is connected to one pole terminal of the current source 24. Winding 20, ball 16 and member 18 thus constitute a variable potentiometer across which a voltage is derived, the level of which is dependent on the position of the ball 16 relative to the winding 20 and is indicated on the voltmeter 25. As the position of the ball is dependent on that of the liquid-level 15 and consequently of the liquid level 13, the voltage indicated by the voltmeter 25 is an indication of the position of the liquid level 13. According as the liquid level 13 fluctuates, the ball 16 rolls along the winding 20 and the member 18, while it is constantly held in engagement by magnetism with said parts to provide a reliable engagement pressure. The winding 20 is preferably a coated resistance wire from which the coating has been removed along the contact path for the ball 16. As the ball can move along its path practically without any other friction than the rolling friction, which is very small, it precisely follows the fluctuations of the liquid level 13, thus giving an exact and reliable indication of the position of the liquid level on the voltmeter 25.

In the event that the liquid, the level fluctuations of which are to be measured, is electrically conductive, the amount of insulating lighter liquid should be so selected that the electrically conductive liquid when exceeding the upper limit of the measuring range of the liquid-level indicator does not yet reach to the winding 20 of the member 18 in the tube 10. If the liquid, the level fluctuations of which are to be measured, is an electrically insulating liquid, this liquid may support the ball 16, and no lighter liquid of electric insulating property need be used in such a case.

The container 11 should be so large as to accommodate, in conjunction with the tube 12, the entire volume of the lighter liquid when no outer liquid pressure exists.

A protective tube 26 concentric with the tube 10 is attached to the container 11 to protect the members and magnetic elements disposed on the outer side of the tube 10.

It is understood that the embodiment described above and illustrated in the drawing can be modified in many ways. It may be mentioned for example that the winding 20 can be dispensed with, the two members 17 and 18 then serving as resistance elements. Furthermore, an ammeter can be substituted for the voltmeter 25, and the winding 20 or member 17 as well as member 18 and the ammeter can be conencted in series over the current source 24. It is also conceivable that the winding 20 or member 17 and member 18 constitute the elements of a measuring bridge of some known type, e. g. a Wheatstone-bridge, and that the instrument 25 is the indicating instrument arranged in such a bridge. The magnetic elements 23 can also be disposed within the tube 10 between the two members 17 and 18 if at least one of said members is provided with a winding or contact surface which is electrically insulated therefrom, no members 21 and 22 being in that case arranged on the outer side of the tube 10. Finally, the movable means can be a roller body other than a ball. It may for instance be a cylinder.

What I claim and desire to secure by Letters Patent is:

1. A liquid-level indicator comprising a substantially vertical liquid-level tube, means forming two electrically conductive substantially parallel surfaces arranged within said tube longitudinally thereof and insulated from each other, a pair of members being magnetized by opposed polarity and extending each along one of said conductive surfaces, movable roller means disposed in said tube and consisting at least in part of electrically conductive and magnetically permeable material to be held in engagement with the conductive surfaces by the magnetism of said members, thus forming an electrical connection between said surfaces, said roller means being adapted to float on the liquid in said tube and to roll along said conductive surfaces according as the liquid-level fluctuates, and an electric circuit connected to said surfaces to indicate the position of the movable roller means relative to said conductive surfaces.

2. A liquid-level indicator according to claim 1 in which at least one of said members constitutes the means forming one of said electrically conductive surfaces.

3. A liquid-level indicator according to claim 1 in which at least one strand of conductive material constitutes the means forming one of the electrically conductive surfaces.

4. A liquid-level indicator according to claim 3 in which said strand is wound on one of said members and is electrically insulated therefrom.

5. A liquid-level indicator according to claim 1 comprising a pair of magnetically permeable members arranged on the outer side of the tube opposite said first-mentioned members arranged in said tube on the interior surface thereof, and a plurality of magnetic elements distributed along said tube and disposed across said members on the outer side of the tube, said magnetic elements having like poles in the same direction.

References Cited in the file of this patent

UNITED STATES PATENTS

| 2,416,059 | Marchment | Feb. 18, 1947 |
| 2,556,347 | Stromberg | June 12, 1951 |